(12) United States Patent
Cooley et al.

(10) Patent No.: US 8,112,785 B1
(45) Date of Patent: Feb. 7, 2012

(54) SYSTEMS AND METHODS FOR ADMINISTERING POLICIES FOR PHYSICAL LOCATIONS

(75) Inventors: Shaun Cooley, El Segundo, CA (US); Brian Powell, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 999 days.

(21) Appl. No.: 11/967,975

(22) Filed: Dec. 31, 2007

(51) Int. Cl.
    *G06F 17/00* (2006.01)
(52) U.S. Cl. ............ 726/1; 455/411; 455/440; 455/456; 342/450
(58) Field of Classification Search ...... 726/1; 455/456, 455/440; 342/450
    See application file for complete search history.

(56) References Cited

U.S. PATENT DOCUMENTS

| | | | |
|---|---|---|---|
| 6,011,973 A | 1/2000 | Valentine et al. | |
| 6,122,486 A | 9/2000 | Tanaka et al. | |
| 6,496,703 B1 | 12/2002 | da Silva | |
| 6,577,274 B1 * | 6/2003 | Bajikar | ......................... 342/450 |
| 6,701,144 B2 | 3/2004 | Kirbas et al. | |
| 6,721,542 B1 | 4/2004 | Anttila et al. | |
| 6,782,266 B2 | 8/2004 | Baer et al. | |
| 6,823,199 B2 | 11/2004 | Gough | |
| 6,832,093 B1 | 12/2004 | Ranta | |
| 6,898,445 B2 | 5/2005 | Slettengren et al. | |
| 6,937,868 B2 | 8/2005 | Himmel et al. | |
| 6,961,561 B2 | 11/2005 | Himmel et al. | |
| 6,973,333 B1 | 12/2005 | O'Neil | |
| 6,993,329 B2 | 1/2006 | Cho et al. | |
| 7,069,027 B2 | 6/2006 | Miriyala | |
| 7,076,255 B2 | 7/2006 | Parupudi et al. | |
| 7,107,038 B2 | 9/2006 | Fitch et al. | |
| 7,194,273 B2 | 3/2007 | Vaudreuil | |
| 7,231,219 B2 | 6/2007 | Curtis et al. | |
| 7,263,367 B1 | 8/2007 | Sabot | |
| 7,272,403 B2 | 9/2007 | Creamer et al. | |
| 7,356,406 B2 | 4/2008 | Harrison et al. | |
| 7,451,195 B1 * | 11/2008 | Seligmann | ..................... 709/220 |
| 7,469,139 B2 * | 12/2008 | van de Groenendaal | ..... 455/411 |
| 2002/0075825 A1 * | 6/2002 | Hills et al. | ..................... 370/329 |
| 2002/0090953 A1 | 7/2002 | Aburai et al. | |
| 2003/0023880 A1 * | 1/2003 | Edwards et al. | .............. 713/201 |

(Continued)

FOREIGN PATENT DOCUMENTS

WO    2003/079216    9/2003

(Continued)

OTHER PUBLICATIONS

Cooley, Shaun; U.S. Appl. No. 11/967,915, filed Dec. 31, 2007.

(Continued)

*Primary Examiner* — Taghi Arani
*Assistant Examiner* — Jason Lee
(74) *Attorney, Agent, or Firm* — Advantedge Law Group

(57) ABSTRACT

A method for receiving verification that a source is authorized to provide mobile-computing-device policies for a first physical location. The method may include receiving a first mobile-computing-device policy and identifying the first physical location. The method may also include associating the first mobile-computing-device policy with the first physical location and implementing, based on the verification, the first mobile-computing-device policy at the first physical location. Systems and computer-readable media for verifying that a source is authorized to provide mobile-computing-device policies for a first physical location are also disclosed.

17 Claims, 10 Drawing Sheets

U.S. PATENT DOCUMENTS

| | | | |
|---|---|---|---|
| 2005/0170850 A1 | 8/2005 | Edwards et al. | |
| 2005/0282559 A1 | 12/2005 | Erskine et al. | |
| 2006/0014547 A1 | 1/2006 | Walter | |
| 2006/0099965 A1* | 5/2006 | Aaron | 455/456.3 |

FOREIGN PATENT DOCUMENTS

| | | |
|---|---|---|
| WO | 2005/117295 A1 | 12/2005 |
| WO | 2009/088823 | 7/2009 |

OTHER PUBLICATIONS

Non-Final Office Action received in related U.S. Appl. No. 11/967,915; Sep. 17, 2009.

Final Office Action received in related U.S. Appl. No. 11/967,915; Feb. 5, 2010.

Connelly et al.; On Negotiating Automatic Device Configuration in Smart Environments; 2004; PERCOMW, pp. 213.

Non-Final Office Action received in related U.S. Appl. No. 11/967,915; Jun. 25, 2010.

Final Office Action received in related U.S. Appl. No. 11/967,915; Dec. 27, 2010.

Search Report and Written Opinion received in related International Application No. PCT/US2008/088410.

Non-Final Office Action Received in U.S. Appl. No. 11/967,915; Jul. 12, 2011.

* cited by examiner

SYSTEMS AND METHODS FOR ADMINISTERING POLICIES FOR PHYSICAL LOCATIONS

BACKGROUND

In the age of instant communication and information exchange, managing the settings of portable devices may be a significant challenge for individuals and enterprises. Network device settings may be difficult to manage because of the increasing complexity of networks and network devices. In particular, location owners may face the challenge of managing network device settings of mobile devices that enter their locations. For example, cell phones and laptops in a library may be allowed for the benefit of patrons, but left unregulated they may prove a distraction and disturbance to other patrons. However, traditional policy management and administration may be insufficient for allowing the library, or any other location owner or manager, to manage portable computing device usage on their property.

Traditional policy management may include both policy definition and policy enforcement. Policy definition may refer to the tools or techniques that allow administrators to define how a network device may be controlled. The second component of traditional policy management—policy enforcement—may refer to the tools or techniques that enforce policy definitions. The automated nature of policy enforcement may reduce the time and effort an administrator spends monitoring a network or network device.

Administrators may implement traditional policy management through fixed-policy enforcement. To implement fixed-policy enforcement, a network administrator may define a set of fixed policies for a network device. The set of fixed policies does not change, regardless of the location or status of the network device, unless the network administrator makes the policy change. While fixed-policy enforcement may be somewhat effective for a small network with a small number of non-portable network devices, fixed-policy enforcement may not be particularly useful to administrators managing portable network devices.

One policy management technique that attempts to address the limitations of fixed-policy enforcement is Network Location Awareness (NLA). NLA may change policy definitions for a device when the device changes networks. NLA may involve technology that allows a device to detect a network, receive a set of policy definitions for that network, then enforce the policies on the device. For example, a laptop with NLA may include one set of policy definitions that corresponds to a home network and another set of definitions that corresponds to a work network. NLA may provide some flexibility over fixed policy in managing portable-computing network devices, but growth and expansion in network environments and use of portable devices may present challenges that neither fixed policy or NLA may address.

NLA and other traditional network-policy management techniques may have limited capabilities in traditional networks and may be even less effective in attempts to control mobile-computing devices within certain physical locations. For example, NLA may be ineffective where a mobile-computing device may be in multiple physical locations but still connected to a single network (e.g., a municipal or 3G network). Thus, location owners and managers may need more effective tools to control network devices within their locations.

SUMMARY

Embodiments of the instant disclosure may address various disadvantages and problems with prior network device administration and may also provide various other advantages and features. For example, some embodiments may verify that a source is authorized to provide mobile-computing-device policies for a physical location. In at least one embodiment, verifying that a source is authorized to provide mobile-computing device policies for a physical location may comprise accessing a database to verify that the source is authorized to provide a first policy for the first physical location. In other embodiments, verifying that a source is authorized to provide mobile-computing device policies for a physical location may comprise receiving a confirmation that the source is authorized to provide the first policy for the first physical location.

Certain embodiments may provide third-party verification that a source is authorized to create and modify mobile-computing device policies for a physical location. Such verification may allow for sources (e.g., administrators) to control mobile device policies for their locations by access to a central control server through an internet interface.

In at least one embodiment, a computer-implemented method may comprise receiving verification that a source is authorized to provide mobile-computing-device policy for a first physical location. The method may also comprise receiving a first mobile-computing-device policy, identifying the first physical location, and associating the first mobile-computing-device policy with the first physical location. The method may further comprise implementing, based on the verification, the first mobile-computing-device policy at the first physical location.

In at least one embodiment, the source may be a location-policy administrator, and the location-policy administrator may be authorized to provide the first policy for the location. In various embodiments, receiving the first mobile-computing-device policy comprises identifying that the first mobile-computing-device policy is received from the location-policy administrator.

Embodiments of the instant disclosure provide various methods, systems, and computer-readable media for allowing a source to manage mobile-device settings for a physical location. Some embodiments may provide improved mobile device management and control capabilities for location owners. Various embodiments may verify that the administrator is authorized to provide mobile-computing device policy for a physical location. Various embodiments may combine some or all of these features and/or may provide alternative or additional features.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
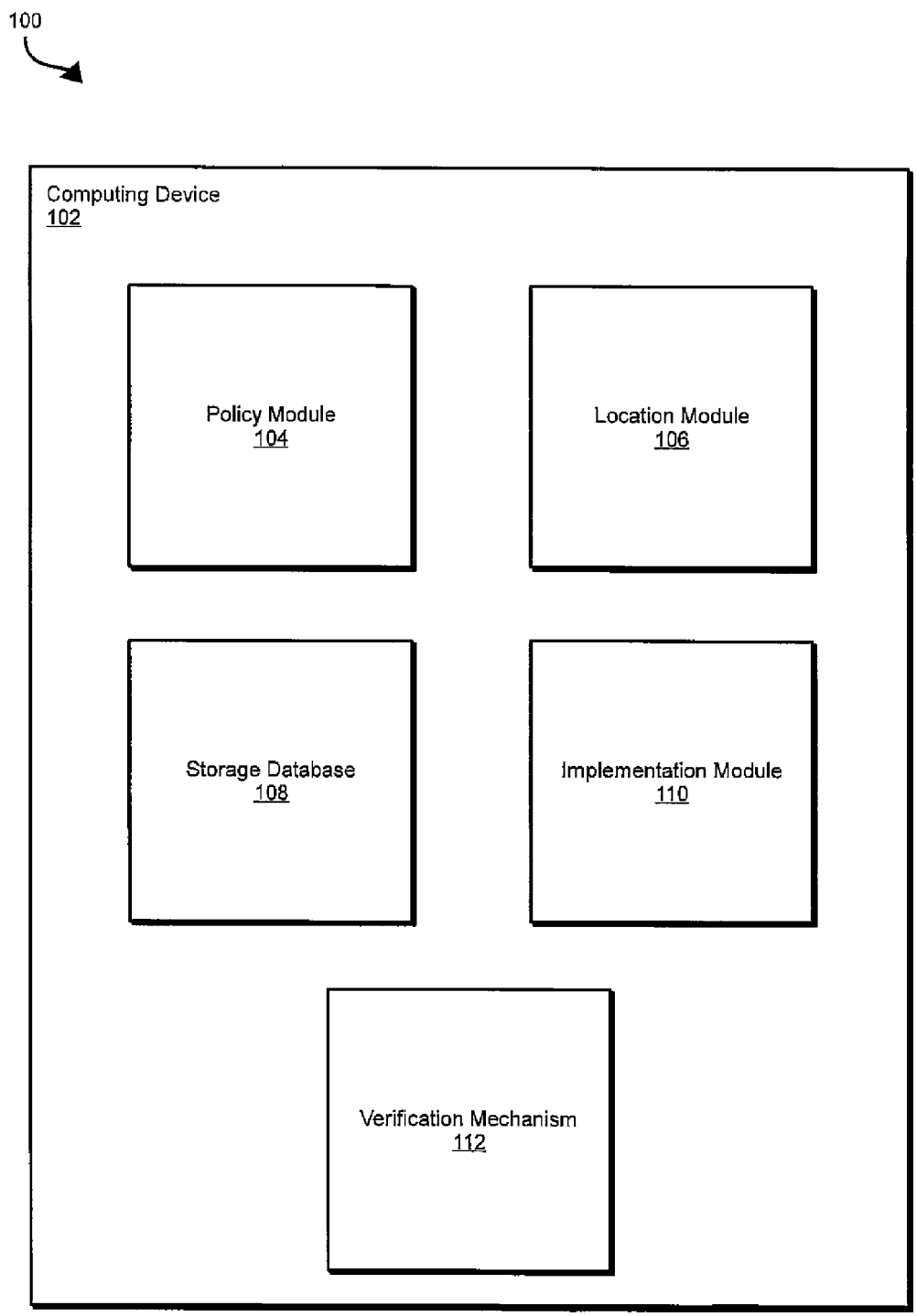
FIG. 1 is a block diagram of a system configured to receive verification from a source according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The following description discusses methods and systems for receiving verification that a source is authorized to provide mobile-computing-device policies for a physical location, and the following examples and figures may enable and describe these methods in a non-limiting and exemplary manner. Location owners may need more efficient and effective technologies to regulate the usage of mobile-computing devices that enter their properties, and the instant disclosure provides the following examples and figures as ways to meet and overcome such challenges.

Prior technologies may provide individual device owners with some degree of device control, but concerns beyond individual device management may require technologies capable of regulating device usage at a location level. While some current tools and technologies may attempt to give location owners some degree of control, it may be difficult to define policies for mobile-computing-device usage without applying a method for verifying that a source (e.g., a location owner) of the location is authorized to provide policies. Also, there may be a need for more intuitive and effective ways to allow sources to define usage policies. For example, internet-based interfaces may provide an intuitive and effective method for receiving policies and location identifiers.

Defining geographical areas to implement policies for mobile-computing devices may pose another challenge to current technologies. Methods that allow for creative and intuitive identifying of geographical areas in which to implement a policy may save time and money. For example, a location owner may manage a building in close proximity to other buildings. Such proximity may require technologies that can define policy areas with more accuracy and specificity.

The above problems, concerns, and solutions provided above are non-limiting and exemplary in nature and are not intended to limit the scope of the instant disclosure. The following description addresses the above as well as other problems in a non-limiting way.

FIG. 1 is an illustration of exemplary system 100 capable of receiving verification from a source and implementing mobile-computing-device policy based on that verification. For example, a library may utilize a server-based system similar to exemplary system 100 in order to better regulate mobile-computing-device policy on library premises. The system may include verifying that the library administrator is authorized to provide mobile-computing device policy for the library. For example, an independent party may verify that the library administrator is in charge of policy and authorized to provide policy for the library.

Exemplary system 100 may include a computing device 102. Computing device 102 may include policy module 104, location module 106, policy-location-information database 108, implementation module 110, and verification mechanism 112. Computing device 102 may comprise computer code operable to perform various embodiments of the instant disclosure.

Policy module 104 may be configured to receive a first mobile-computing-device policy, and location module 106 may be configured to identify a first physical location. Policy module 104 may receive a single policy or multiple policies and store the policies in policy-location-information database 108. Likewise, location module 106 may identify a single or multiple physical locations and store the locations in policy-location-information database 108. Policy-location-information database 108 may also store other data regarding the first mobile-computing-device policy, the first physical location, and/or the associations between the policy and location, as will be discussed in FIG. 2.

Implementation module 110 may be configured to enforce, based on the verification, the first mobile-computing-device policy at the first physical location. In some embodiments, implementation module 110 may be located on a mobile-computing device. In various embodiments, implementation module 110 may be served-based software, or may be part of the server and/or the mobile-computing device. The mobile computing device may include, without limitation, a laptop, a mobile phone, or a personal digital assistant.

Verification mechanism 112 may be configured to verify authorization of a source. For example, verification mechanism 112 may be responsible for verifying a person who claims to have authority to administer policy at a school is actually authorized to do so. In some embodiments, verification mechanism 112 may include elements separate from computing device 102. For example, verification mechanism 112 may include software that tells a device to send a letter to the physical address of a first physical location. Verification mechanism 112 may also send the letter itself or cause the letter to be sent.

Figure 2:
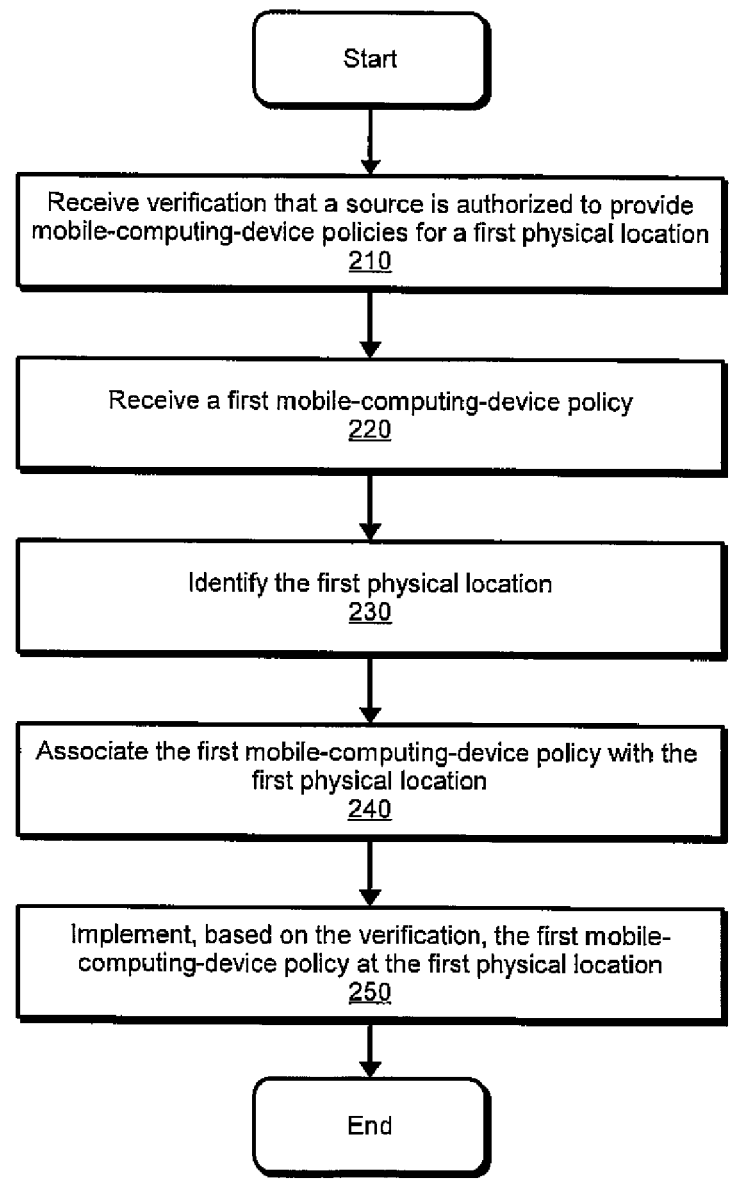
FIG. 2 is a flow diagram of a computer-implemented method capable of receiving verification that a source is authorized to provide mobile-computing-device policy according to certain embodiments.

FIG. 2 illustrates a method 200 for receiving verification that a source is authorized to provide mobile-computing-device policy for a first physical location and then implementing, based on that verification, the first mobile-computing device policy with the first physical location. Method 200 may be implemented using a system similar to exemplary system 100. Each step in the method may be performed by a computing device such as computing device 102, and the steps of method 200 may occur in a different order than illustrated in FIG. 2.

At step 210, in some embodiments the verification mechanism may receive verification that a source is authorized to provide mobile-computing-device policy for a first physical location. Receiving verification may comprise receiving verification that a source is authorized. Receiving verification may also include verifying that the source is authorized. For example, in one embodiment the verification mechanism may verify the source is authorized by contacting the owner of a hospital and verifying that the hospital owner is authorized to provide mobile-computing device policy for the hospital. In some embodiments, the process of verifying that a source is authorized may be performed separate from the verification mechanism, and the verification mechanism may simply receive the verification. In alternative embodiments, the verification mechanism may access a database to verify that the source is authorized to provide policies for the physical location. For example, a third party may verify that that hospital owner is authorized to provide policy for a hospital and store that information in a database. The verification mechanism may then access and search the database to verify that the hospital owner may provide policy for the hospital.

The phrase "mobile-computing-device policy" may refer generally to the overall mobile-computing-device policy of the first physical location, which may include multiple policies. In some embodiments, the phrase may refer to the area in which the policies may be implemented. For example, the hospital owner may be authorized to provide the physical location of the hospital as well as the policies that should be enforced within that physical location. In some embodiments, the hospital owner may do nothing more than define the physical locations for a mobile-computing-device policy to be implemented.

At step 220, a computing device, such as computing device 102 in FIG. 1, may receive a first mobile-computing-device policy. The first-mobile-computing-device policy may be setting policies or usage policies. Examples of policies may include, but are not limited to, a ringer setting, a lighting setting, an incoming call setting, an outgoing call setting, a power setting, an email setting, a voicemail setting, a sound setting, a network setting, a network access setting, a network usage setting, a camera setting, a global positioning system setting, a messaging setting, a bluetooth setting, an infrared data association setting, an installed application setting, a built-in application setting, and/or a communication setting. In various embodiments, the first mobile-computing-device policy may contain at least one of the above examples.

In some embodiments, the policy may be received from the source through an internet-based interface. For example, the hospital owner may access, via the internet, a server similar to computing device 102. Policy module 104 may be server-based software configured to provide the hospital owner with a graphical user interface for inputting the policy. In some embodiments, the hospital owner may select the policy from a set of pre-defined policies. Policy module 104 may then store the policy in a database similar to policy-location-information database 108 along with any other relevant information or data concerning the policy.

At step 230 of FIG. 2, a computing device such as computing device 102 in FIG. 1 may identify the first physical location. In various embodiments, the physical location may generally refer to a real world location. For example, the real-world physical location of the hospital may be referred to as the first physical location. The process of identifying may be performed in various non-limiting embodiments. In one embodiment, identifying the first physical location may be receiving, from the source, geographical coordinates of the first physical location. In some embodiments, identifying the first physical location may include receiving, from the source, boundaries of the first physical location. In another embodiment, identifying the first physical location may include receiving, from the source, an address of the first physical location. The above embodiments for identifying the first physical location will be discussed in greater detail below with the description corresponding to FIGS. 4-7.

The identification of the first physical location may be stored in a database similar to policy-location-information database 108. For example, geographical coordinates identifying the boundaries of the hospital may be stored in a database along with policy information. At step 240 of method 200, a computing device similar to computing device 102 in FIG. 1 may associate the first mobile-computing-device policy with the first physical location and may store these associations in a database similar to policy-location-information database 108.

At step 250, a computing device similar to computing device 102 of FIG. 1 may implement, based on the verification (step 210), the first mobile-computing-device policy at the first physical location. Methods and systems for implementing mobile-computing-device policy are described with greater detail in connection to FIG. 8.

In some embodiments, the source may be a location-policy administrator authorized to provide the first policy for the first location. Examples of location-policy administrators may include, but are not limited to, owners of restaurants, principals of schools, owners of hospitals, administrators or owners of churches, airport administrators, theater owners, or any other person or group authorized to provide policy for their respective locations.

In various embodiments, receiving the first mobile-computing-device policy may include identifying that the first mobile-computing-device policy is received from the location-policy administrator. For example, the principal of a school may be required to provide a login username and password to access an internet-based interface capable of receiving a policy for the location.

The following discussion provides an example of how the principles of FIGS. 1 and 2 may be implement. A principal of a school may desire to regulate the use of mobile-computing devices on school grounds. The principal may wish to provide a policy that turns the ringer setting of cell phones off. At step 210 of FIG. 1, a computing device similar to computing device 102 in FIG. 1 may verify that the principal is authorized to provide mobile-computing-device policy for the school. The principal, in this example, may have already been verified as authorized by a third party and the verification mechanism have received this verification.

At step 220, a policy module may receive a policy from the principal defining that the ringer settings are to be turned off for all cell phones while on school premises. At step 230, a location module may receive an address of the school from the principal. In some embodiments, the location module may be configured to receive an address and identify, based on the address, the physical location (e.g., geographical coordinates or boundaries) of the school. At step 240, the no-ring setting for cell phones may be associated with the school boundaries and stored in a database similar to policy-location-information database 108. At step 250, an implementation module may enforce the mobile-computing-device policy within the boundaries of the school.

In certain embodiments, the computing device may contain pre-defined policies for certain physical locations. For example, the computing device may contain a pre-defined policy for all schools. The computing device may, upon discovering that the location is a school, associate the pre-defined policy with geographical coordinates that correspond to the school. Thus, the principal may only need to specify that the first physical location is a school, and the pre-defined policy associated with schools may be automatically applied.

Figure 3:
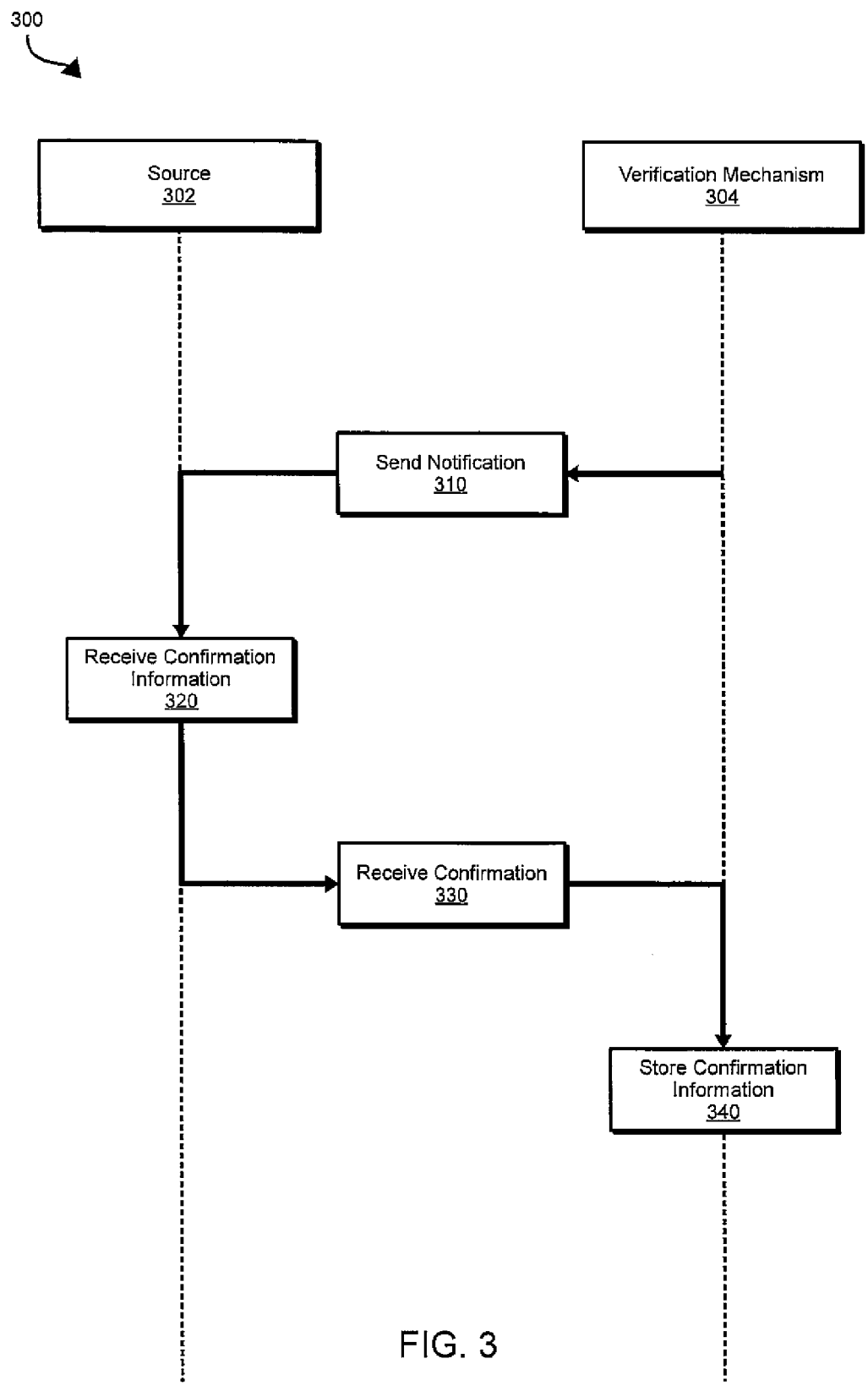
FIG. 3 is a flow diagram of a computer-implemented method for receiving verification that a source is authorized to provide mobile-computing-device policy for physical locations according to certain embodiments.

FIG. 3 illustrates an exemplary method 300 for receiving verification that a source is authorized to provide mobile-computing-device policy for a first physical location. Method 300 shows exemplary communications between a source 302 and a verification mechanism 304. In some embodiments, source 302 may be a client device or terminal accessible by a location owner, a location-policy administrator, or any person or source authorized to provide policies for a physical location. For example, the manager of a restaurant may be a source authorized to define policies for the first physical location (e.g., the restaurant)

In some embodiments, verification mechanism 304 may be any mechanism configured to send notifications to a source, receive confirmations from a source, and/or verify that the source is authorized to provide mobile-computing-device policy. For example, verification mechanism 304 may be software capable of identifying when verification of a source is needed and may prompt mail to be sent to the physical address. The mail may include a password for a policy-administrator account or other information that the source may used to confirm that the source received the mail and/or is authorized to provide policies for the physical location. In some embodiments, the mail may direct the source to call a verification phone number or reply by mailing a letter to a verification administrator.

Verification mechanism 304 may also include software capable of identifying when confirmation mail has been returned or when a source has been verified over the phone. For example, the location administrator of a school may either mail back a notification confirmation or call to verify over the phone. A verification administrator may store verification information in a database configured to allow a computing device, such as computing device 102, retrieve verification information.

At step 310, verification mechanism 304 may send a notification to source 302 in any of methods previously discussed. At step 320, the source may receive confirmation information contained within the notification. Confirmation information may be any information that is required to be returned or verified by the source in order to complete the authorization process. Confirmation may include, but is not limited to, personal identification numbers (PINs), passwords, identification information, confirmation numbers, or any other suitable information that may be returned or provided by the source in order to complete the verification process.

At step 330, verification mechanism 304 may receive confirmation from the source. In certain embodiments, confirmation may be received via any suitable method including mail, email, third party verification, or telephone verification. After receiving the confirmation information, the verification mechanism may store the confirmation.

As noted in the previous example, the principal of a school may want to regulate the usage of cell-phones. In one embodiment, the principal may have provide policies and location information before being verified as a source authorized to provide policies for the school. Upon receiving the policies and location information, the verification mechanism may initiate a verification process before implementing the policies for the school. In some embodiments, verification mechanism 304 may poll a database (e.g., policy-location-information database 108) to determine whether the principal is authorized to provide policies for the school. In other embodiments, the verification mechanism may send a notification to a physical address of the school, as previously discussed.

Figure 4:
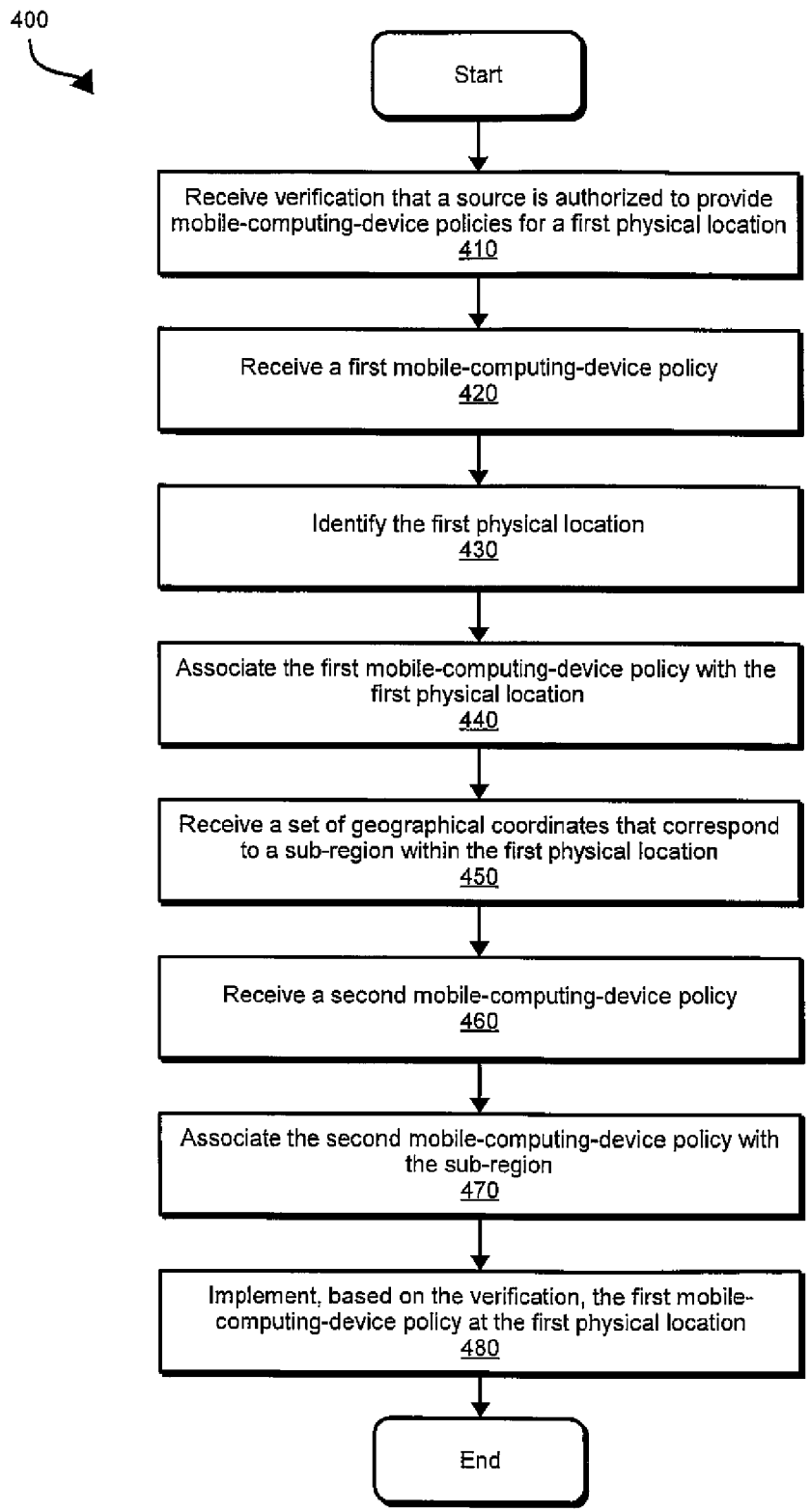
FIG. 4 is a flow diagram of a computer-implemented method for receiving multiple policies and identifying multiple locations according to at least one embodiment.

FIG. 4 illustrates and exemplary method 400 for receiving multiple policies and identifying multiple locations. A system similar to exemplary system 100 may be used to implement one or more of the steps in FIG. 4. At step 410, a verification mechanism may receive verification that a source is authorized to provide mobile-computing-device policy for a first physical location. At step 420, a policy module may receive a first mobile-computing device policy. At step 430, a location module may identify the first physical location. A computing device similar to computing device 102 may then associate the first mobile-computing-device policy with the first physical location (step 440).

At step 450, the location module may receive a set of geographical coordinates that correspond to a sub-region within the first physical location. For example, the location module may receive a set of 5 coordinates that define a boundary for a school (first physical location), and then a set of 4 coordinates that define a library area (sub-region) within the school. At step 460, the policy module may receive a second mobile-computing-device policy. For example, a principal may choose a "no-ring" setting for the first policy and a "no incoming calls" setting for the second policy. At step 470, the computing device may associate the second mobile-computing-device policy with the sub-region. At step 480, the implementation module may implement, based on the verification, the first mobile-computing device policy at the first physical location.

Figure 5:
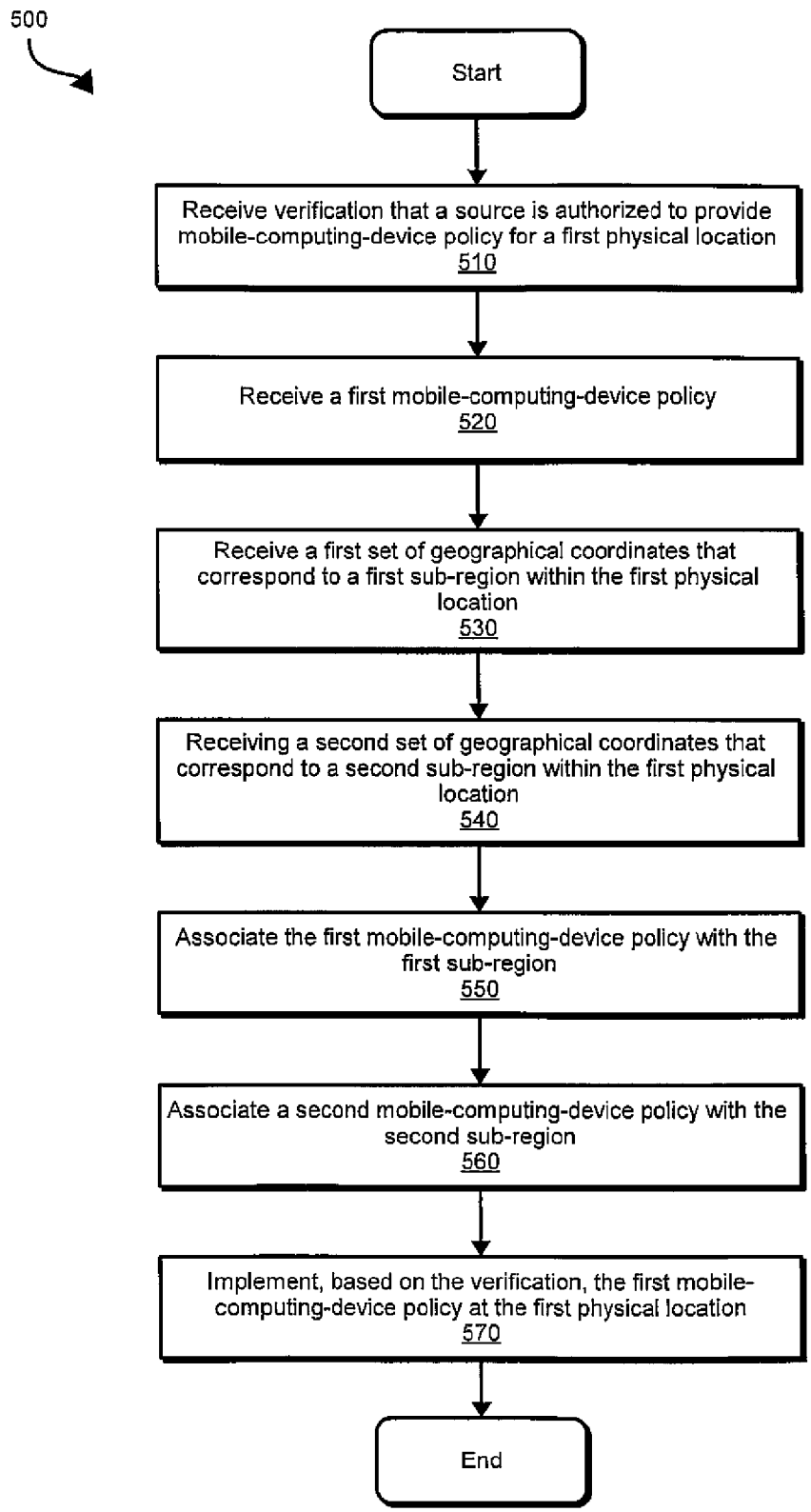
FIG. 5 is a flow diagram of a computer-implemented method for receiving and implementing policies for multiple sub-regions according to an additional embodiment.

In many scenarios it may be advantageous to define policies for multiple sub-regions within a first physical location. Location administrators, for example, may be able to regulate each part of their location with tighter control. FIG. 5 illustrates a method for receiving and implementing policies for multiple sub-regions. At step 510, a verification mechanism may receive verification that a source is authorized to provide mobile-computing-device policies for a first physical location. A policy module may then receive a first mobile-computing-device policy (step 520). At step 530, a location module may receive a first set of geographical coordinates that correspond to a first sub-region within the first physical location. At step 540, the location module may receive a second set of geographical coordinates that correspond to a second sub-region within the first physical location. At step 550, a computing device similar to computing device 102 may associate the first mobile-computing-device policy with the first sub-region, and at step 560 the computing device may associate a second mobile-computing-device with the second sub-region. At step 570, an implementation module may implement, based on the verification, first mobile-computing-device policy at the first physical location.

Figure 6:
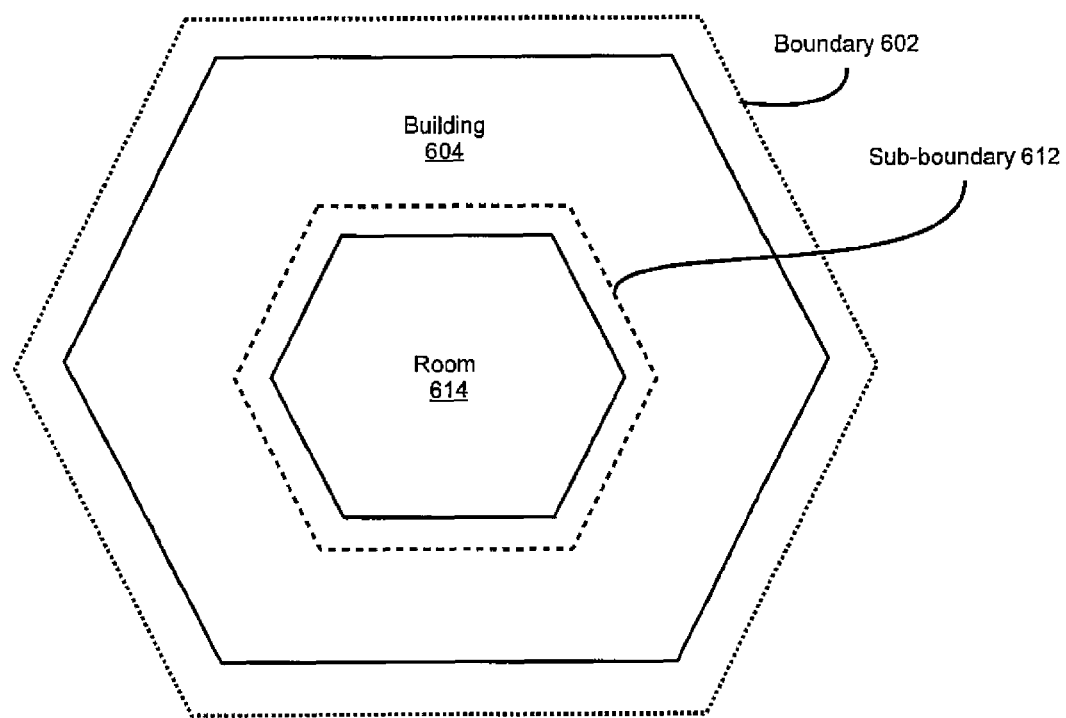
FIG. 6 is a block diagram of a physical location with multiple boundaries according to an additional embodiment.

In some exemplary embodiments, the physical locations described in methods 400 and 500 may correspond to boundaries of buildings. In certain embodiments, a sub-region may be identified within the first physical location. FIG. 6 illustrates a first physical location and a sub-region located within the first physical location. A boundary 602 may be defined to encompass building 604. A sub-boundary 612 may be defined to encompass a room 614 within building 604.

In one example, building 604 may be a school and room 614 may be the library of the school. A location module may identify boundary 602 as the first physical location. A policy may be received defining that all cell-phones within boundary 602 be on the lowest ringer setting and that incoming and outgoing calls would not be permitted except for during lunch hours. The location module may also identify sub-boundary 612 as geographical coordinates corresponding to a sub-region within the first physical location. A policy may be associated with sub-boundary 612 defining that all cell phones may be set to vibrate and no incoming or outgoing calls may be allowed except for emergency phone numbers. The policy may also state that laptops are fully functional but restricted from visiting certain websites.

A physical location may be defined by a boundary of any shape or size. In some embodiments, a boundary box may be defined using two geographical coordinates (e.g., latitude and longitude coordinates). A boundary may also be defined with more than two geographical coordinates and may provide a useful tool to develop boundaries unique to the physical locations they correspond to. In some embodiments, identifying the first physical location includes receiving at least three coordinates. Boundaries of various different shapes and sizes may be defined by three or more geographical coordinates.

In certain exemplary embodiments, physical locations and sub-regions may be identified by an internet-based interface. The internet-based interface may be provided by the location module. The interface may provide tools that allow a location-policy administrator to draw and/or define different shapes and boundaries to define the first physical location and sub-regions. For example, software may be provided on a computing system similar to computing device 102 in FIG. 1 that allows a principal of a school to identify the boundaries of a school. The internet-based interface may provide tools for the principal to aid in developing unique shapes to fit the shape of the school and/or rooms within the school.

Figure 7:
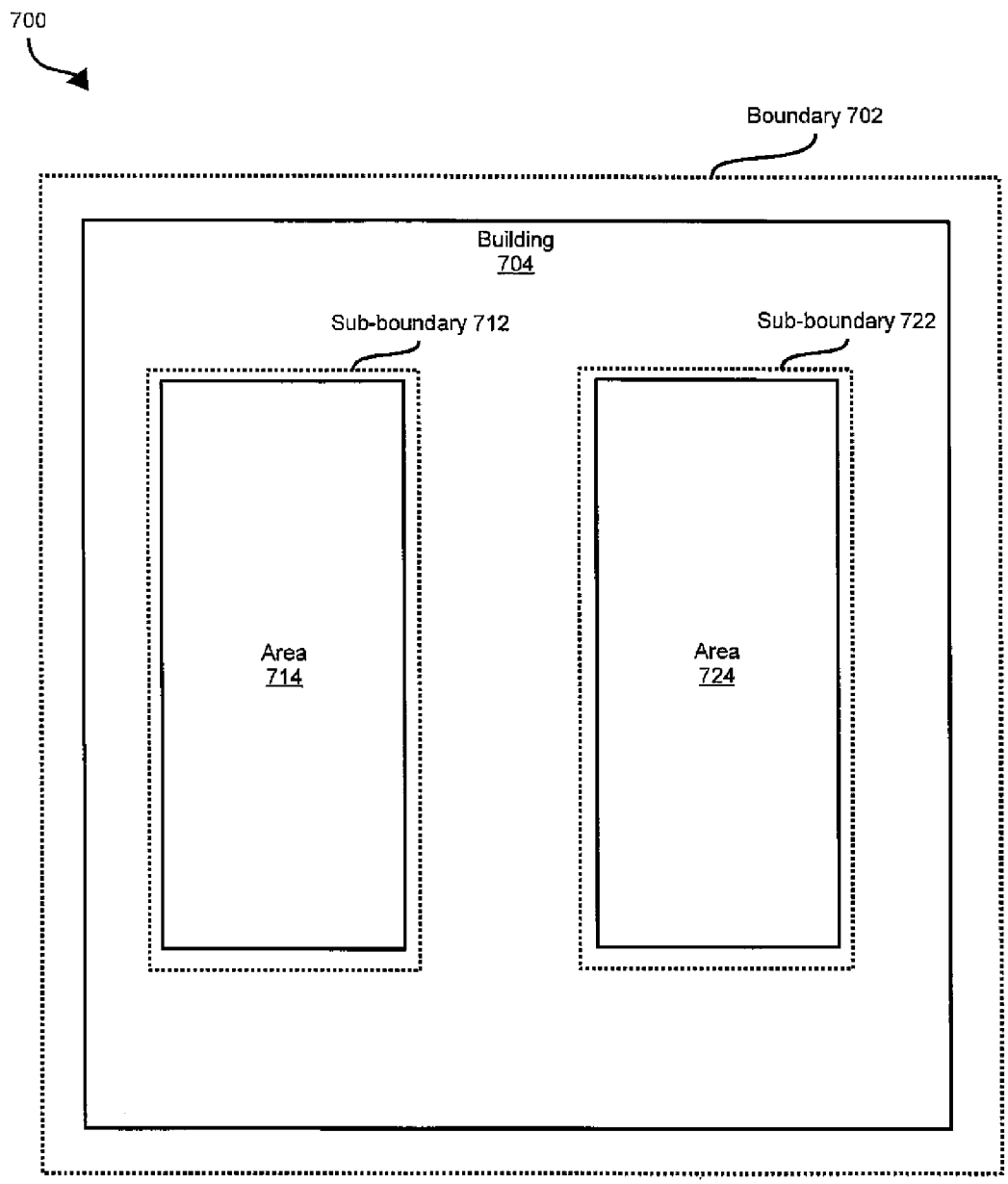
FIG. 7 is a block diagram of a physical location with multiple sub-regions according to an additional embodiment.

In some embodiments, a first physical location may include more than one sub-region. FIG. 7 illustrates exemplary drawings of multiple sub-regions. FIG. 7 illustrates a real-world location 700. Real-world location 700 may include a boundary 702 defined to be around a building 704. A sub-boundary 712 may be defined around an area 714, and a sub-boundary 722 may be defined around an area 724.

In one embodiment, real-world location 700 may be located[1] in a city. Building 704 may be a church, area 714 may be a chapel within the church, and area 724 may be a community center within the church. Boundary 702 may be referred to as a physical location. Sub-boundary 712 and sub-boundary 722 may be referred to as first and second sub-regions. In this example, a pastor may want to define policy that will turn off cell-phones for members of the congregation in the chapel and allow limited cell phone use in the community center. The pastor may also want to allow full use of cell-phones in anywhere else in the church (e.g., hallways, bathrooms, foyers). Boundary 702, being the whole church, may not be associated with any policy. Sub-boundary 712 may be associated with the chapel's "no cell phone usage" policy. Sub-boundary may 722 may be associated with the community center's "limited cell phone use" policy.

Figure 8:
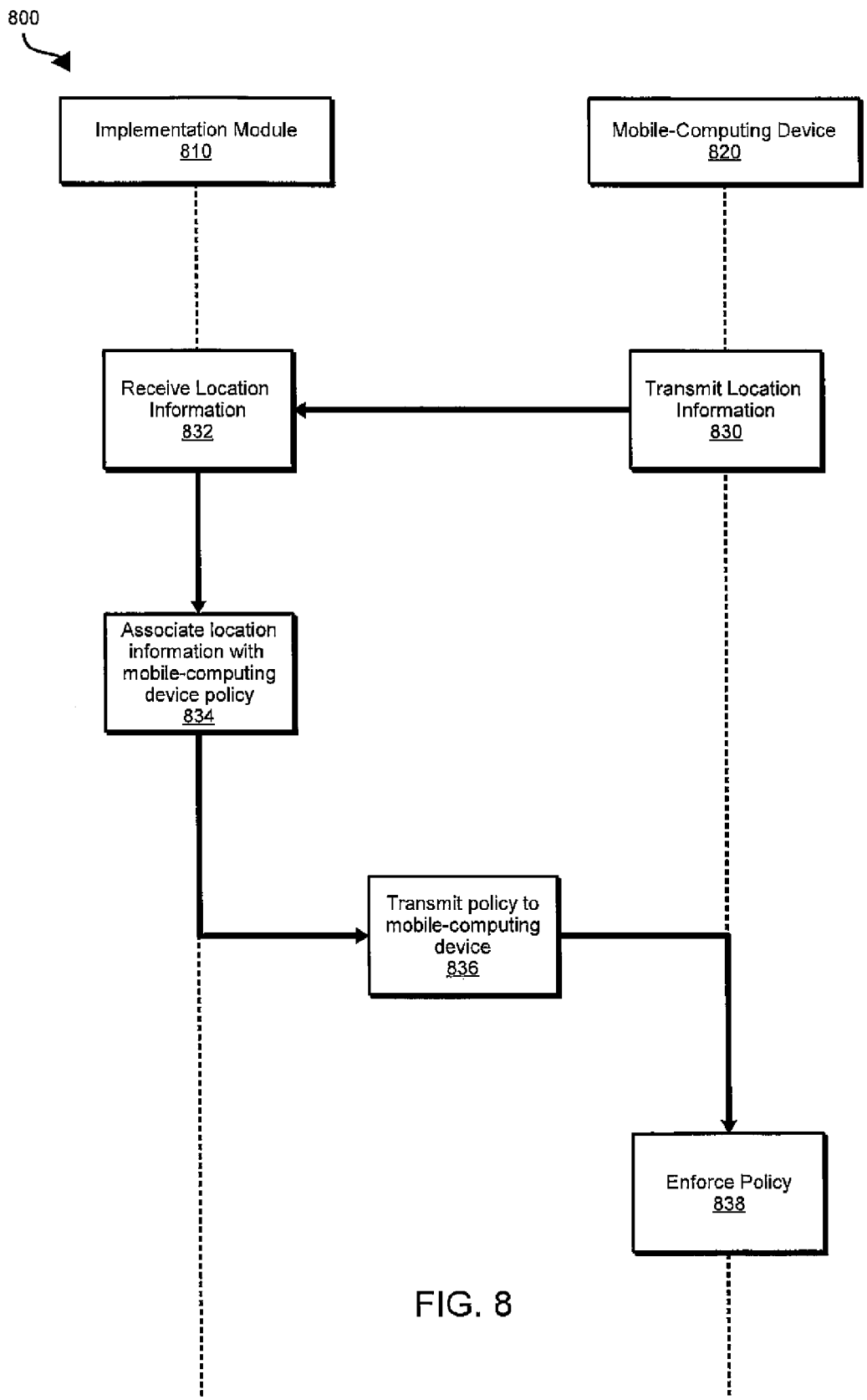
FIG. 8 is a flow diagram of an exemplary computer-implemented method for implementing mobile-computing-device policies according to an additional embodiment.

In some embodiments, implementing the first mobile-computing-device policy includes determining that a mobile-computing device is within the first physical location. FIG. 8 is an illustration of exemplary method 800 for implementing, based on the verification, the first mobile-computing-device policy at the first physical location. Method 800 shows exemplary communications between an implementation module 810 and a mobile-computing device 820. At step 830, mobile-computing device 820 may transmit location information to implementation module 810. For example, a cell phone may transmit GPS coordinates or may use any other triangulation or location technology to determine where the cell phone is located. At step 832, implementation module 810 may receive location information. At step 834 implementation module 810 may associate the location information with a mobile-computing-device policy. At step 836, implementation module 836 may transmit the policy to the mobile-computing device. At step 838, the policy may be implemented (e.g., enforced) on the mobile-computing device.

FIG. 8 may correspond to exemplary embodiments of FIG. 7. For example, a church patron's cell phone may transmit a GPS signal to an implementation module server every five seconds. When the patron enters building the church, the cell phone may transmit GPS coordinates to the implementation module. The implementation module may receive the patron's cell phones coordinates and search for a database for an associated policy. Because there may be no policy associated with building 704, no policy will be transmitted to the patron's cell phone. Once the church patron enters area 714, the cell phone may transmit its GPS again to implementation module 810. The implementation may associate the location information of the patron's cell phone with the policy for sub-boundary 712 (the chapel's policy). At step 836 this policy may then be transmitted to the patron's cell phone, and at step 838 the cell phone may enforce the policy by turning off while in the chapel.

According to various embodiments, receiving verification that a source is authorized to provide mobile-computing-device policies may comprise receiving verification that a source has authority to create or change one or more mobile-computing device policies associated with a physical location. In various embodiments, receiving a first mobile-computing device policy may comprise allowing a location administrator to set or select one or more device-setting policies for a particular mobile-computing device or a set of mobile-computing devices. In some embodiments, a location administrator may be provided with an account that allows the administrator to input or change policies for a mobile-computing device. The location administrator may input mobile-computing device policies through an Internet-based interface or any other suitable interface.

According to various embodiments, identifying a first physical location may comprise receiving, from the administrator, geographical coordinates of the first physical location. As previously discussed, identifying the first physical location may comprise receiving, from the administrator, boundaries of the first physical location. In at least one embodiment, identifying the first physical location may comprise receiving an address of the first physical location. In such embodiments, the address may be converted into geographical coordinates or any other suitable boundary definition for the first physical location.

After receiving the mobile-computing-device policy for the mobile-computing device and the identification of the first physical location, the management module may store the mobile-computing device and the identification of the first physical location in a record. The record may be stored in a database or any other suitable storage mechanism.

When the a mobile-computing device enters the first physical location, an implementation module may implement the mobile-computing-device policy on the mobile computing device. In some embodiments, implementing a mobile-computing-device policy may comprise changing a first setting on the first mobile-computing device while the first mobile-computing device is within the first physical location. The setting may be associated with the first mobile-computing device policy. For example the setting may be a volume setting, and the mobile-computing-device policy may be a volume level of "3." Implementing the first mobile-computing-device policy may comprise changing the volume level on the device to "3" if the volume level is not already set to "3." If the volume level is already set to "3," the mobile-computing device may verify that the volume level matches the mobile-computing-device policy. In other embodiments, the mobile-computing device may do nothing if the volume level already matches the mobile-computing-device policy.

Figure 9:
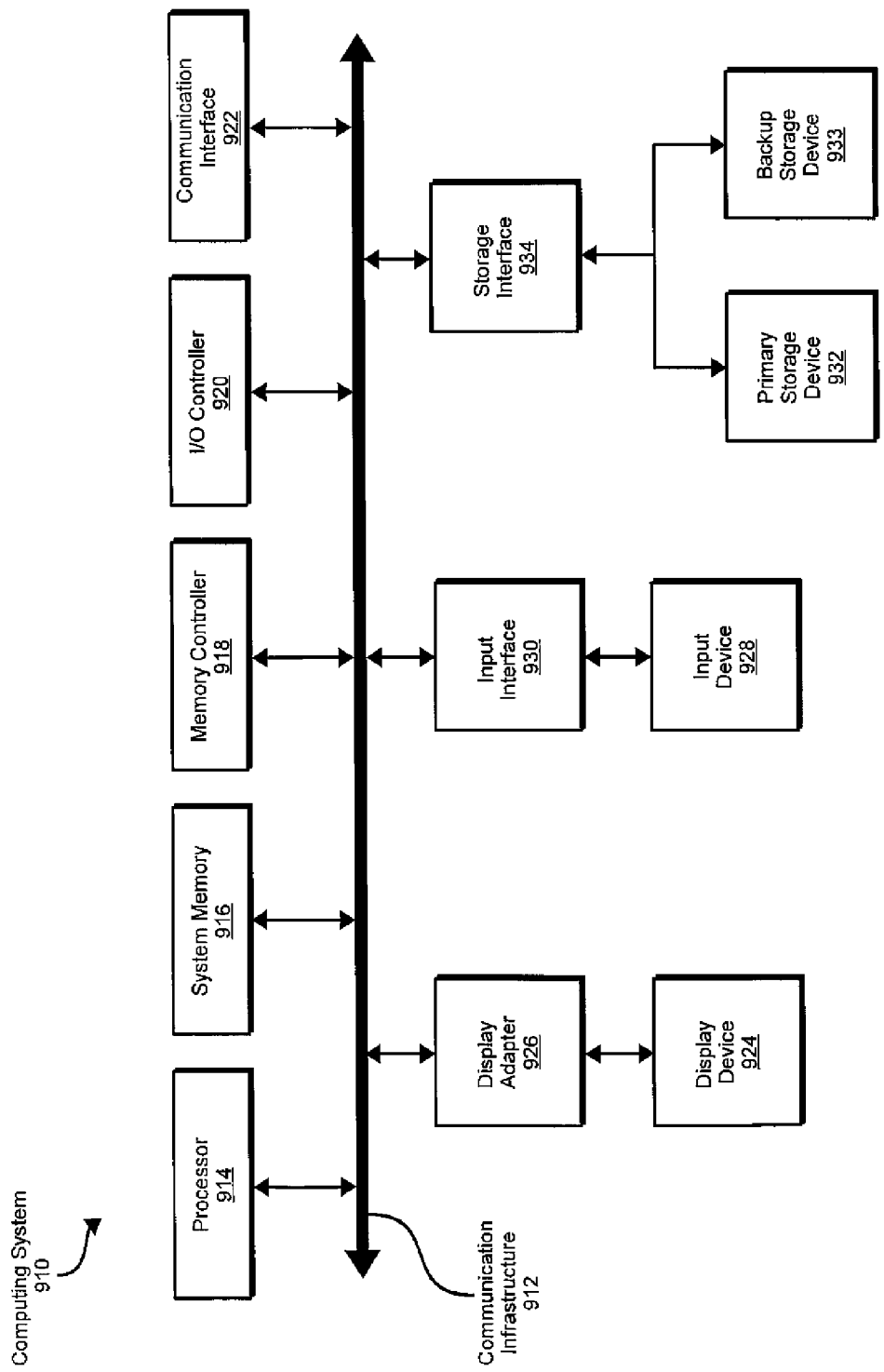
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the receiving, comparing, identifying, transmitting, receiving, broadcasting, and determining steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as system memory 916) and a non-volatile storage device (such as primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as receiving, comparing, identifying, transmitting, receiving, broadcasting, and determining.

I/O controller 920 generally represents any type or form of module capable of coordinating and/or controlling the input and output functions of a computing device. For example, in certain embodiments I/O controller may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the receiving, comparing, identifying, transmitting, receiving, broadcasting, and determining steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. In certain embodiments, communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the receiving, comparing, identifying, transmitting, receiving, broadcasting, and determining steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the receiving, comparing, identifying, transmitting, receiving, broadcasting, and determining steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, the exemplary file systems disclosed herein may be stored on primary storage device 932, while the exemplary file-system backups disclosed herein may be stored on backup storage device 933. Storage devices 932 and 933 may also be used, for example, to perform and/or be a means for performing, either alone or in combination with other elements, one or more of the receiving, comparing, identifying, transmitting, receiving, broadcasting, and determining steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments descried and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
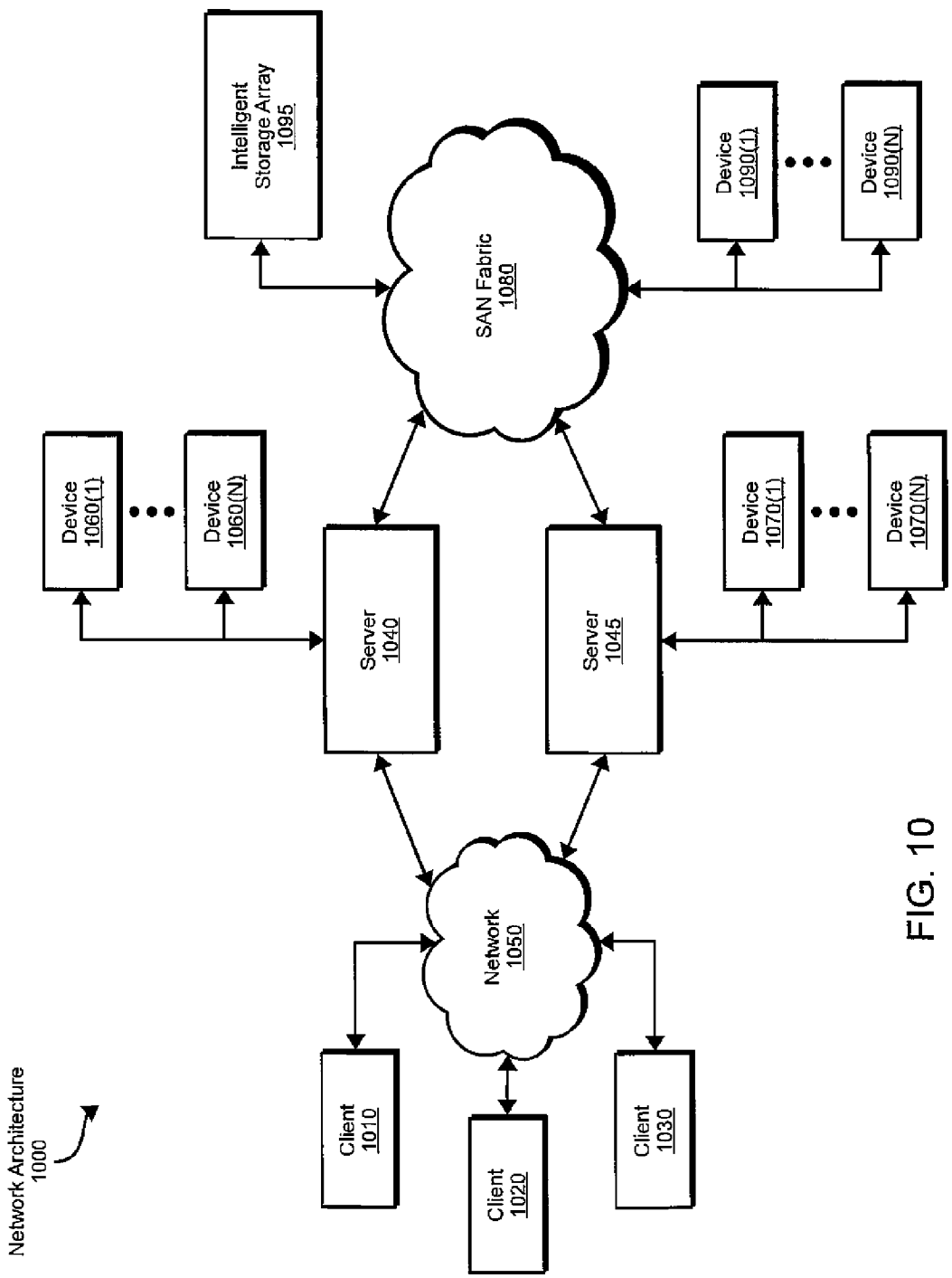
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1090(1)-(N) may be directly attached to server 1045. Storage devices 1060(1)-(N) and storage devices 1090(1)-(N) generally represent any type or form of storage device or medium capable of storing data and/or other computer-readable instructions. In certain embodiments, storage devices 1060(1)-(N) and storage devices 1090(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that storage devices 1090(1)-(N) and intelligent storage array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on servers 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the receiving, comparing, identifying, transmitting, receiving, broadcasting, and determining steps disclosed herein. Network architecture 1000 may also be used to perform and/or be a means for performing other steps and features set forth in the instant disclosure.

As detailed above, computing system 1010 and/or one or more of the components of network architecture 1000 may perform and/or be a means for performing, either alone or in combination with other elements, one or more steps of the exemplary methods described and/or illustrated herein. In one embodiment, this exemplary computer-implemented method may comprise identifying login information for a first user account associated with the first online community, accessing the first user account using the login information from the first user account, obtaining information from the first user account, and modifying, based on the information obtained from the first user account, a second user account associated with the second online community.

In some embodiments, identifying the login information for the first user account may comprise receiving the login information for the first user account from a user or retrieving the login information from the first user account from a login-information database. The method may further comprise, prior to modifying the second user account associated with the second online community, identifying login information for the second user account and accessing the second user account using the login information for the second user account. The method may also further comprise obtaining information from the second user account and modifying, based on the information obtained from the second user account, the first user account.

In certain embodiments, accessing the first user account may comprise logging in to the first user account using the login information for the first user account. Accessing the first user account may also comprise accessing the first user account using a community-specific access module. In addition, obtaining information from the first user account may comprise receiving computer-readable data associated with the first user account or extracting human-readable data associated with the first user account.

In at least one embodiment, the information obtained from the first user account may comprise user-account data. The information obtained from the first user account may also comprise at least one contact record, which may comprise contact identification information, an email address, a phone number, a fax number, a mailing address, a website address, or an instant-messaging address.

In certain embodiments, modifying the second user account may comprise editing, based on the information obtained from the first user account, at least one preexisting contact record, creating, based on the information obtained from the first user account, at least one new contact record, or deleting at least one contact record. In addition, modifying the second user account may comprise creating the second user account and the second online community, creating, based on the information obtained from the first user account, at least one new contact record for the second user account, and transmitting an invitation to join the second online community to a contact identified in the at least one new contact record.

In some embodiments, the method may also comprise providing a graphical user interface that allows a user to modify login information, community access settings, community synchronization settings, or the like. The method may also comprise modifying, based on the information obtained from the first user account, a third user account associated with a third online community. In addition, the method may further comprise, prior to accessing the first user account, receiving a request from a user to synchronize the first user account with the second user account.

Computing system 1010 and/or one or more of the components of network architecture 1000 may also represent all or portions of exemplary system 100 in FIG. 1. For example, computing system 1010 and/or one or more of the components of network architecture 1000 may represent portions of a system for automatically synchronizing online communities, which system may comprise a login module for managing login information for at least a first user account associated with the first online community, a community-access module for accessing the first user account using the login information for the first user account, and obtaining information from the first user account, and a community synchronization module for modifying, based on the information obtained from the first user account, a second user account associated with the second online community.

In certain embodiments, the community-access module may further comprise at least one community-specific access module. In addition, the system may further comprise a graphical-user-interface module for providing a graphical user interface that allows a user to modify login information, community access settings, or synchronization settings.

The system may also comprise a login-information database for storing login information for user accounts associated with online communities, and obtain-information data base for storing information obtained from online communities, and a community-specific-access-module database for storing community-specific access modules.

As detailed above, all or portions of exemplary system 100 in FIG. 1 (such as modules 104-112) may represent a software application or program that, when executed by a computing device, may cause the computing device to perform one or more tasks required to automatically synchronize online communities. In this embodiment, all or portions of exemplary system 100 in FIG. 1 may represent computer-readable media comprising one or more computer-executable instructions that, when executed by a computing device, may cause a computing device to identify login information for a first user account associated with the first online community, access the first user account using the login information for the first user account, obtain information from the first user account, and modify, based on the information obtained from the first user account, a second user account associated with the second online community.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for administering policies for physical locations, at least a portion of the computer-implemented method being performed by a computing device comprising at least one processor, the computer-implemented method comprising:
    receiving verification that a source is authorized to provide mobile-computing-device policies specific to a first physical location;
    receiving a first mobile-computing-device policy specific to the first physical location;
    identifying the first physical location, wherein identifying the first physical location comprises at least one of receiving, from the source, a set of geographical coordinates of the first physical location, receiving, from the source, boundaries of the first physical location, and/or receiving, from the source, an address of the first physical location;
    associating the first mobile-computing-device policy with the first physical location such that the first mobile-computing-device policy is implemented while a mobile-computing device is located within the first physical location;
    determining that the mobile-computing device is located within the first physical location;
    implementing the first mobile-computing-device policy at the first physical location in response to the mobile-computing device being located within the first physical location.

2. The computer-implemented method of claim 1, wherein:
    the source is a location-policy administrator, the location-policy administrator being authorized to provide the first policy for the first physical location;
    receiving the first mobile-computing-device policy comprises identifying that the first mobile-computing-device policy is received from the location-policy administrator.

3. The computer-implemented method of claim 1, wherein receiving verification comprises:
    accessing a database that stores information that identifies sources that are authorized to provide policies for a particular location;
    searching the database to verify that the source is authorized to provide the first policy specific to the first physical location.

4. The computer-implemented method of claim 1, wherein receiving verification that the source is authorized to provide mobile-computing-device policies specific to the first physical location comprises verifying that the source is authorized by:
    contacting an owner of a building;
    verifying that the owner of the building is authorized to provide policies specific to the building.

5. The computer-implemented method of claim 1, wherein implementing the first mobile-computing-device policy comprises:
    enforcing the first mobile-computing-device policy on at least one of:
        a mobile phone;
        a laptop;
        a personal digital assistant device.

6. The computer-implemented method of claim 1, wherein receiving verification further comprises:
    prompting mail to be sent to a physical address associated with the first physical location, the mail comprising information capable of being used by the source to confirm that the source is authorized to provide the first policy specific to the first physical location.

7. The computer-implemented method of claim 1, wherein:
    identifying the first physical location comprises:
        receiving, through an internet-based interface, a first location identifier that corresponds to the first physical location;
    receiving the first mobile-computing-device policy comprises:
        receiving, through an internet-based interface, the first mobile-computing-device policy.

8. The computer-implemented method of claim 1, further comprising:
- receiving the set of geographical coordinates that corresponds to a sub-region within the first physical location;
- receiving a second mobile-computing-device policy;
- associating the second mobile-computing-device policy with the sub-region.

9. The computer-implemented method of claim 1, wherein:
- identifying the first physical location comprises:
  - receiving a first set of geographical coordinates that corresponds to a first sub-region within the first physical location;
  - receiving a second set of geographical coordinates that corresponds to a second sub-region within the first physical location;
- associating the first mobile-computing-device policy with the first physical location comprises:
  - associating the first mobile-computing device policy with the first sub-region;
  - associating a second mobile-computing device policy with the second sub-region.

10. The computer implemented method of claim 1, wherein receiving verification that the source is authorized to provide mobile-computing-device policies specific to the first physical location comprises verifying that the source is authorized by:
- contacting a principal of a school;
- verifying that the principal of the school is authorized to provide policies specific to school grounds.

11. The computer-implemented method of claim 1, wherein receiving verification that the source is authorized to provide mobile-computing-device policies specific to the first physical location comprises:
- enabling a third party to verify that the source is authorized to provide mobile-computing-device policies specific to the first physical location.

12. A system for administering policies for physical locations, the system comprising:
- a verification mechanism configured to verify that a source is authorized to provide mobile-computing-device policies specific to a first physical location, wherein the verification mechanism is configured to perform at least one of receiving, from the source, a set of geographical coordinates of the first physical location, receiving, from the source, boundaries of the first physical location, and/or receiving, from the source, an address of the first physical location;
- a policy module configured to receive a first mobile-computing-device policy specific to the first physical location;
- a location module configured to identify the first physical location;
- a policy-location-information database configured to store policy information;
- an implementation module configured to enforce the first mobile-computing-device policy on a mobile-computing device located at the first physical location in response to the mobile-computing device being located within the first physical location;
- at least one hardware processor configured to execute the policy module, the location module, and the implementation module.

13. The system of claim 12 further comprising a server, wherein the server comprises the verification mechanism, the policy module, the location module, the policy-location-information database, and the implementation module.

14. The system of claim 12, wherein the implementation module further comprises:
- the mobile-computing device being configured to transmit location information;
- a device-location mechanism configured to receive location information from the mobile computing device;
- a determination module configured to determine whether the location information indicates that the mobile computing device is within the first physical location;
- a transmission mechanism configured to send the first mobile-computing-device policy to the mobile computing device;
- an enforcement module configured to enforce the first mobile-computing-device policy on the mobile computing device.

15. The system of claim 12, wherein the verification mechanism comprises:
- a notification mechanism configured to send a notification to a physical address associated with the first physical location;
- a confirmation mechanism configured to receive confirmation from the source.

16. The system of claim 12, wherein the verification mechanism comprises:
- an authorization database configured to store source authorization data;
- an authorization search module configured to search the authorization database for source authorization data.

17. A non-transitory computer-readable-storage medium comprising one or more computer-executable instructions that, when executed by at least one processor of a mobile-computing device, cause the mobile-computing device to:
- receive verification that a source is authorized to provide mobile-computing-device policies specific to a first physical location;
- receive a first mobile-computing-device policy specific to the first physical location;
- identify the first physical location;
- associate the first mobile-computing-device policy with the first physical location such that the first mobile-computing-device policy is implemented while the mobile-computing device is located within the first physical location;
- implement the first mobile-computing-device policy at the first physical location in response to the mobile-computing device being located within the first physical location;
- receive a set of geographical coordinates that corresponds to a sub-region within the first physical location;
- receive a second mobile-computing-device policy;
- associate the second mobile-computing-device policy with the sub-region.

* * * * *